United States Patent [19]

Thörmer et al.

[11] Patent Number: 4,631,309

[45] Date of Patent: Dec. 23, 1986

[54] SHAPED ARTICLES FOR USE IN THE EXPLORATION FOR AND/OR PRODUCTION OF PETROLEUM AND NATURAL GAS

[75] Inventors: Joachim Thörmer, Leverkusen; Friedrich Leibbrandt, Kuerten; Zsolt Szentivanyi, Leverkusen; Hartmuth Buding, Dormagen, all of Fed. Rep. of Germany

[73] Assignee: Bayer Aktiengesellschaft, Leverkusen, Fed. Rep. of Germany

[21] Appl. No.: 678,720

[22] Filed: Dec. 6, 1984

Related U.S. Application Data

[63] Continuation of Ser. No. 510,286, Jul. 1, 1983, abandoned.

[30] Foreign Application Priority Data

Jul. 13, 1982 [DE] Fed. Rep. of Germany ....... 3226081

[51] Int. Cl.$^4$ ........................ C08F 8/04; C08K 3/26; C08K 3/36
[52] U.S. Cl. .................................... 524/426; 522/24; 522/151; 524/566; 525/329.3; 525/338; 526/338
[58] Field of Search ............. 526/338; 525/338, 329.3; 522/24, 151; 524/566, 426

[56] References Cited

U.S. PATENT DOCUMENTS

| | | | |
|---|---|---|---|
| 2,585,583 | 2/1952 | Pinkney | 525/329.3 |
| 2,813,809 | 11/1957 | Jones et al. | 524/426 |
| 3,625,927 | 12/1971 | Yoshimoto et al. | 525/329.3 |
| 3,645,958 | 2/1972 | Palumbo et al. | 524/566 |
| 3,700,637 | 10/1972 | Finch | 525/329.3 |
| 3,988,504 | 10/1976 | Halasa | 525/329.3 |
| 4,431,704 | 2/1984 | Springer | 524/566 |

FOREIGN PATENT DOCUMENTS

1436763 5/1976 United Kingdom.

OTHER PUBLICATIONS

Hach's Chemical Dictionary, (1972), p. 659, by McGraw-Hill, Inc.

Primary Examiner—Harry Wong, Jr.
Attorney, Agent, or Firm—Connolly and Hutz

[57] ABSTRACT

Equipment for the exploration and/or production of petroleum and natural gas having elastomeric components have high resistance to materials encountered if the elastomeric components are shaped from a hydrogenated butadiene-acrylonitrile copolymer with a residual double bond content less than 1% and unhydrogenated nitrile groups.

4 Claims, No Drawings

SHAPED ARTICLES FOR USE IN THE EXPLORATION FOR AND/OR PRODUCTION OF PETROLEUM AND NATURAL GAS

This is a continuation of application Ser. No. 510,286 filed July 1, 1983, now abandoned.

This invention relates to shaped articles of hydrogenated butadiene-acrylonitrile copolymers for use in the exploration for and/or production of petroleum and natural gas.

Drill pipes, suspension gear, pumps, tubes and also safety and other fittings containing numerous rubber components are used in the exploration for and production of petroleum and natural gas. Some of these rubber components perform a sealing function, while others are intended to act as protectors or elastic bearing elements which fix devices introduced into the well and protect them against damage. In addition, rubber hoses varying widely in construction are used. Furthermore, the power-supply cables are largely rubber cables.

The stresses to which such rubber components are subjected emanate from the natural environment conditions, for example in the well, from the chemicals introduced during drilling, production and cleaning and from the drilling of the well and the modus operandi of the drilling and production equipment used.

Accordingly, the rubber components in question have to satisfy the following requirements: high tensile strength, high abrasion resistance, low permanent deformation after compressive and tensile stressing, high heat resistance and high resistance to oils which may contain hydrogen sulphide and amines.

In cases where there is direct contact with the petroleum or natural gas to be produced or where such cannot be ruled out, the elastomers mainly used at the present time are acrylonitrile-butadiene rubber (NBR), optionally carboxylated acrylonitrile-butadiene rubber (XNBR), chloroprene rubber (CR), fluorinated rubber (FPM), fluorosilicone rubber (MFQ), polysulphide rubber (T) and silicone rubber (Q).

However, each of these elastomers satisfies only some of the above-mentioned requirements. For example, NBR and XNBR show high tensile strength values, high oil resistance and excellent abrasion resistance, but only limited resistance to ageing under heat and hardly any resistance to hydrogen sulphide, while FPM shows outstanding resistance to oils, heat and hydrogen sulphide, but is attacked by amines.

Accordingly, there is a need for a type of elastomer which satisfies not just some of the above-mentioned requirements stipulated for rubber components used in the exploration for and production of petroleum and natural gas, but may be universally used, i.e. satisfactorily meets the requirements mentioned above.

It has now surprisingly been found that shaped articles of hydrogenated butadiene-acrylonitrile copolymers satisfy these requirements and are therefore particularly suitable for use in the exploration for and/or production of petroleum and natural gas.

Accordingly, the present invention relates to shaped articles of a rubber for use in the exploration for and/or production of petroleum and natural gas, characterized in that the rubber is a hydrogenated butadiene-acrylonitrile copolymer.

The butadiene-acrylonitrile copolymer used in accordance with the present invention is preferably completely hydrogenated, i.e. it does not contain any C—C-double bonds. However, it may have a residual double bond content of less than 1%. The nitrile group of the acrylonitrile remains intact.

The acrylonitrile content of the copolymer is preferably from 24 to 55%, by weight, more preferably from 28 to 50%, by weight, most preferably from 33 to 44%, by weight. These copolymers are known and may be produced by the hydrogenation of butadiene-acrylonitrile copolymers in accordance with U.S. Pat. No. 3,700,637 and DE-OS No. 2,539,132.

The hydrogenated copolymers may be cross-linked radically, i.e. chemically, or by using high-energy radiation of by grafting silanes, followed by hydrolysis, in the conventional manner and under the usual conditions.

Before cross-linking, rubber mixtures are prepared from the hydrogenated copolymers using conventional methods and apparatus. In the following, the abbreviation "phr" indicates "parts, by weight, of mixture constituent per 100 parts, by weight, of hydrogenated copolymer".

The rubber mixture based on hydrogenated butadiene-acrylonitrile copolymer contains:

from 20 to 200 phr, preferably from 35 to 110 phr, of fillers, such as carbon black, pyrogenic or precipitated silica, silicates, talcum, kaolin or chalk;

from 0 to 5 phr, preferably from 0 to 1.5 phr, of processing aids, such as stearic acid and its zinc or calcium salts, and, as filler activators, particularly for light fillers, conventional commercially-available silanes which participate in the radical cross-linking reaction;

from 0 to 6 phr, preferably from 2 to 4 phr, of natural and/or synthetic wax, such as PE-wax or carnauba wax;

from 0 to 15 phr, preferably from 2 to 7 phr, of metal oxides, such as magnesium oxide, zinc oxide or mixtures thereof;

from 0 to 3 phr, preferably from 0 to 1.5 phr, of anti-agers, which do not prevent cross-linking, such as styrenised diphenylamine or polymerised 1,2-dihydroquinoline, in combination with synergistic anti-agers, such as mercaptobenzimidazole and derivatives thereof;

from 0 to 30 phr, preferably from 0 to 15 phr, of plasticizers, which also do not impede cross-linking, such as mineral oil, dicarboxylic acid esters, sulphonic acid esters or phosphoric acid esters.

Conventional commercially-available peroxides, such as dialkyl peroxides, ketal peroxides, aralkyl peroxides, peroxide ethers or peroxide esters, are incorporated for radial cross-linking. Preferred peroxides are di-t-butyl peroxide, bis-(t-butyl-peroxyisopropyl)-benzene, dicumyl peroxide, 2,5-dimethyl-2,5-di-(t-butyl-peroxy)-hexane, 2,5-dimethyl-2,5-di-(t-butyl-peroxy)-3-hexane, 1,1-bis-(t-butyl-peroxy)-3,3,5-trimethylcyclohexane, benzoyl peroxide, t-butyl cumyl peroxide or t-butyl-perbenzoate.

The quantities of peroxide used should preferably not exceed 15 phr, quantities of from 4 to 8 phr being preferred.

Radiation-induced cross-linking requires energy densities of from 5 to 25 Mrad, energy densities of from 10 to 15 Mrad being preferred.

In all forms of radical cross-linking, it is advantageous to use so-called "cross-linking activators" which are worked into the rubber mixture in quantities of from 0 to 10 phr, preferably from 1 to 6 phr. Suitable cross-linking activators are triallyl cyanurate and derivatives thereof, triallyl isocyanurate and derivatives thereof, unsaturated esters of polyhydric alcohols, allyl esters of polybasic inorganic and organic acids, also N,N'-m-phenylene dimaleide and derivatives thereof.

Cross-linking via grafting silanes, followed by hydrolysis, may be carried out using suitable, conventional commercially-available unsaturated silanes which are peroxidically grafted onto the polymer by the known sioplas process and hydrolytically cross-linked after shaping.

The following rubber mixture has proved to be particularly favourable in regard to the required properties:

| polymer | 100 parts, by weight |
| stearic acid | 1 part, by weight |
| magnesium oxide | 7 parts, by weight |
| zinc oxide | 3 parts, by weight |
| triallyl isocyanurate | 2 parts, by weight |
| styrenised diphenylamine | 1.1 parts, by weight |
| zinc salt of 2-mercapto-benzimidazole | 0.4 part, by weight |
| carbon black "N 660" | 45 parts, by weight |
| bis-(t-butyl-peroxyisopropyl)-benzene | 7.5 parts, by weight |

The mixture was prepared in the above order on laboratory mixing rolls.

The mixture was press-vulcanised at 170° C. for 20' and then tempered for 15 h at 160° C.

The mechanical properties were determined using a type II standard test bar, the following results being obtained:

| tensile strength | (MPa) | 25.6 |
| breaking elongation | (%) | 275 |
| modulus at 100% | (MPa) | 6.1 |
| hardness | (Shore A) | 73 |
| elasticity | (%) | 36 |
| abrasion | (mm$^3$) | 48 |
| compression set | | |
| DIN 53 517/A, 5 d 150° C. | (%) | 41 |
| 42 d 150° C. | (%) | 62 |

In the same way as NBR and XNBR, the vulcanisates of the described copolymers show high tensile strength, excellent abrasion resistance and high oil resistance, but show significant improvements in the resistance thereof to hot air and to hydrogen sulphide.

Compared with FPM, the vulcanised copolymers are superior in tensile strength, abrasion resistance and in resistance to media containing hydrogen sulphide and amines, such as crude oils, salt and flushing solutions.

In general, the copolymers used have a much broader spectrum of application than the polymers hitherto used in the above field.

It has occasionally been found that, in certain applications as mentioned above, the favourable properties of the present copolymers may advantageously be rounded off by blending with radically cross-linkable non-swelling elastomers.

By virtue of its range of properties, the hydrogenated butadiene-acrylonitrile copolymer may advantageously be used, for example, in the following branches of petroleum and natural gas exploration and production:

seals for the various types of drill pipes, suspension gear and tubes, such as O-rings and grooved rings either individually or in the form of packs;

pack seals and the like;

adjusting elements, spacers, protectors and elastic bearings (including inflatable types) for drill pipes, suspension gear, tubes and units;

seals and inserts for blow-out preventers;

seals, membranes and balls for control valves and the like;

seals, membranes and bladders for pulse dampers and the like;

closure plugs;

seals, membranes, rotors (impellers) and stators of pumps;

plugs and seals for tube cleaning;

reinforced and non-reinforced hoses;

floating hoses;

cable insulations and sheaths.

EXAMPLE 1

800 parts, by weight, of a hydrogenated butadiene-acrylonitrile copolymer having an ACN-content of 34% and a residual double bond content of 0.6% were thoroughly mixed with the following quantities of ingredients on laboratory mixing rolls pre-heated to 50° C.:

| 6 parts, by weight, of stearic acid |
| 56 parts, by weight, of magnesium oxide, |
| 24 parts, by weight, of zinc oxide, |
| 16 parts, by weight, of triallyl isocyanurate, |
| 8.8 parts, by weight, of styrenised diphenylamine, |
| 3.2 parts, by weight, of the zinc salt of 2-mercaptobenzimidazole, |
| 360 parts, by weight, of carbon black "N660", |
| 60 parts, by weight, of bis-(t-butyl-peroxyisopropyl)-benzene. |

The test specimens were punched out in accordance with DIN 53 502 from 2 mm sheets which had been vulcanised for 20 minutes at 170° C. and then tempered for 15 hours at 160° C. The test specimens for determining abrasion and compression set were similarly prepared in accordance with DIN 53 502, vulcanised and then tempered in the same way.

The tensile test was carried out on 2 mm standard test bars in accordance with DIN 53 504.

Abrasion was determined in accordance with DIN 53 516.

Compression set was determined in accordance with DIN 53 517, test specimen A.

Ageing was carried out in a cell oven at 150° C.

Storage in ASTM oil 3 under 3 bars hydrogen sulphide pressure was carried out in an autoclave.

The results are set out in Table 1.

COMPARISON EXAMPLE 1

1200 parts, by weight, of a conventional commercially-available peroxide-cross-linkable fluorinated rubber were thoroughly mixed with the following ingredients on laboratory mixing rolls:

| 36 parts, by weight, pf red lead, |
| 36 parts, by weight, of triallylisocyanurate |
| 360 parts, by weight, of carbon black "N990" |
| 36 parts, by weight, of 2,5-dimethyl-2,5-di-(t-butylperoxy)-hexane. |

The test specimens were produced in the same way as described in Example 1. Vulcanisation was carried out for 10' at 180° C. The test specimens were tempered for 24 h at 200° C.

All the vulcanisate properties and also the results of storage in various media are shown in Table 1.

COMPARISON EXAMPLE 2

800 parts, by weight, of a conventional commercially-available NBR having an ACN-content of 34% were thoroughly mixed with the following ingredients on laboratory mixing rolls heated to 40° C.:

8 parts, by weight, of stearic acid,
64 parts, by weight, of magnesium oxide,
40 parts, by weight, of zinc oxide,
12 parts, by weight, of styrenised diphenylamine,
24 parts, by weight, of the zinc salt of 2-mercaptobenzimidazole,
440 parts, by weight, of carbon black "N550",
20 parts, by weight, of TMTD,
16 parts, by weight, of dibenzothiazyl disulphide,
2.16 parts, by weight, of sulphur.

The vulcanisates and test specimens were produced in the same way as in Example 1, except that vulcanisation was only carried out for 15 minutes at 170° C. and the test specimens were not tempered.

All the vulcanisate properties and also the results of storage in various media are shown in Table 1.

TABLE 1

|  |  | NBR-hydro-genated | FPM | NBR |
|---|---|---|---|---|
| Tensile strength | (MPa) | 25.6 | 16.3 | 18.2 |
| Breaking elongation | (%) | 275 | 140 | 360 |
| Modulus at 100% | (MPa) | 6.1 | 10.2 | 4.6 |
| Hardness | (Shore A) | 73 | 84 | 75 |
| Elasticity | (%) | 36 | 9 | 26 |
| Hot-air ageing (cell oven) | | | | |
| 5 d/150° C. | | | | |
| Tensile strength | (MPa) | 23.6 | 16.9 | 11.6 |
| Breaking elongation | (%) | 245 | 140 | 50 |
| Modulus at 100% | (MPa) | 9.1 | 10.3 | — |
| Hardness | (Shore A) | 77 | 83 | 91 |
| 10 d/150° C. | | | | |
| Tensile strength | (MPa) | 23.5 | 18.6 | —(*) |
| Breaking elongation | (%) | 215 | 145 | — |
| Modulus at 100% | (MPa) | 10.4 | 11.2 | — |
| Hardness | (Shore A) | 78 | 81 | 95 |
| 21 d/150° C. | | | | |
| Tensile strength | (MPa) | 22.1 | 19.4 | 6.3 |
| Breaking elongation | (%) | 185 | 150 | — |
| Modulus at 100% | (MPa) | 12.1 | 11.2 | — |
| Hardness | (Shore A) | 80 | 81 | 97 |
| 42 d/150° C. | | | | |
| Tensile strength | (MPa) | 21.3 | 16.5 | 4.6 |
| Breaking elongation | (%) | 135 | 135 | — |
| Modulus at 100% | (MPa) | 16.2 | 10.9 | — |
| Hardness | (Shore A) | 84 | 85 | 97 |

(*) Bars broke on clamping

| Compression set according to DIN 53 517 (test specimen A) | | | |
|---|---|---|---|
| 5 d/150° C. in hot air (%) | 40.5 | 27.5 | 83 |
| 42 d/150° C. in hot air (%) | 62.0 | 42.5 | >100 |
| 5 d/150° C. in ASTM-oil 3 (%) + 0.25% of 1,4-diaminobenzene + 0.25% of "Vulkanox 4030" (**) | 4.0 | 23.5 | 75 |
| 12 d/150° C. in ASTM-oil 3 (%) + 0.25% of 1,4-diaminobenzene + 0.25% of "Vulkanox 4030" (**) | 9.5 | 22.0 | 78 |
| 5 d/125° C. in crude oil | | | |

TABLE 1-continued

| TP 81/802(*) (%) | 8.5 | 18.0 | 37.5 |
|---|---|---|---|
| 12 d/125° C. in crude oil TP 81/802 (%) | 10.0 | 19.5 | 42.5 |

Ageing in a crude oil reference fluid consisting of:
ASTM-oil 3
0.25% of diaminobenzene
0.25% of "Vulkanox 4030"
under 3 bars H$_2$S pressure

| 5 d/150° C. | | | | |
|---|---|---|---|---|
| Tensile strength | (MPa) | 21.5 | 10.9 | 4.5 |
| Breaking elongation | (%) | 245 | 100 | 75 |
| Hardness | (Shore A) | 64 | 86 | 75 |
| Change in weight | (%) | 23.9 | 2.8 | 13.8 |
| Change in volume | (%) | 27.8 | 3.2 | 14.9 |
| 10 d/150° C. | | | | |
| Tensile strength | (MPa) | 25.2 | 8.2 | 7.7 |
| Breaking elongation | (%) | 210 | 60 | — |
| Hardness | (Shore A) | 69 | 88 | 87 |
| Change in weight | (%) | 24.6 | 3.0 | 15.9 |
| Change in volume | (%) | 27.0 | 4.0 | 15.5 |
| 21 d/150° C. | | | | |
| Tensile strength | (MPa) | 24.6 | 6.2 | 13.5 |
| Breaking elongation | (%) | 130 | 20 | — |
| Hardness | (Shore A) | 74 | 89 | 93 |
| Change in weight | (%) | 26.6 | 2.2 | 17.9 |
| Change in volume | (%) | 28.5 | 4.2 | 15.0 |
| 42 d/150° C. | | | | |
| Tensile strength | (MPa) | 19.7 | 5.6 | — |
| Breaking elongation | (%) | 75 | 10 | — |
| Hardness | (Shore A) | 81 | 91 | 93 |
| Change in weight | (%) | 28.6 | 1.1 | 18.3 |
| Change in volume | (%) | 29.9 | 4.2 | 14.6 |

(*)North Seal crude oil
(**)Trade Mark of BAYER AG, corresponds to N,N'-di-(1,4-dimethyl-pentyl)-p-phenylene diamine Abrasion (mm$^3$) according to DIN 53 516 in a crude oil reference fluid consisting of:
ASTM-oil 3
0.25% of 1,4-diaminobenzene
0.25% of "Vulkanox 4030" (**)
under 3 bars of H$_2$S pressure

| 0-value | 48 | 139 | 75 |
|---|---|---|---|
| 5d/150° C. | 60 | 171 | 81 |
| 10d/150° C. | 74 | 140 | 96 |
| 21d/150° C. | 69 | 188 | 147 |
| 42d/150° C. | 84 | 193 | 270 |

We claim:

1. Shaped filled rubber articles for use in the exploration for and/or production of petroleum and natural gas, wherein the rubber is a crosslinked hydrogenated butadiene-acrylonitrile copolymer having an acrylonitrile content of from 24 to 55%, by weight, a residual double bond content less than 1%, with the nitrile moieties remain unhydrogenated, and wherein the filler amounts to 20 to 200 parts per hundred parts of copolymer.

2. Shaped articles as claimed in claim 1, characterised in that the acrylonitrile content of the copolymer is from 28 to 50%, by weight.

3. Shaped articles as claimed in claim 1, characterised in that the acrylonitrile content of the copolymer is from 33 to 44%, by weight.

4. Shaped articles according to claim 1 wherein the filler is carbon black, pyrogenic silica, precipitated silica, silicates, or chalk.

* * * * *